Aug. 22, 1933.  A. B. WEBB  1,923,288
MEANS FOR APPLYING PUSH OR PULL OF MOTOR VEHICLE TO INCREASE TRACTION
Filed Sept. 26, 1930   2 Sheets-Sheet 2
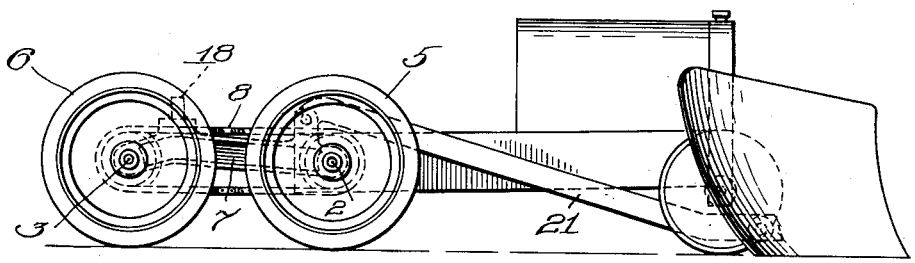
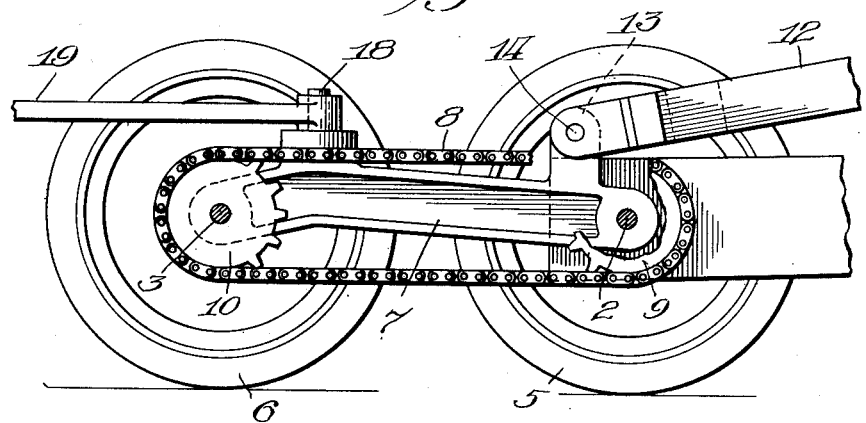

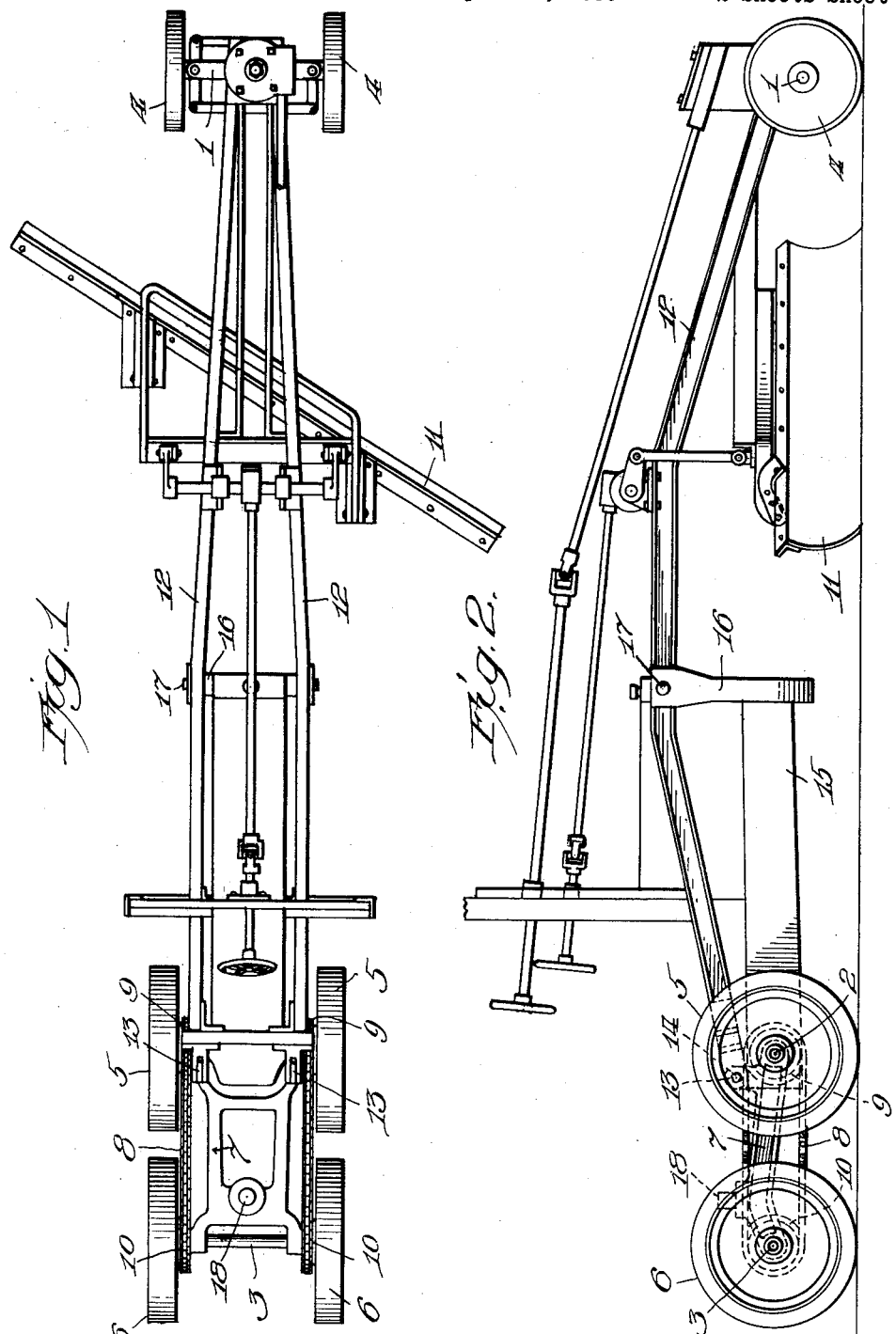

Patented Aug. 22, 1933

1,923,288

UNITED STATES PATENT OFFICE 1,923,288

MEANS FOR APPLYING PUSH OR PULL OF MOTOR VEHICLE TO INCREASE TRACTION

Arthur B. Webb, Milwaukee, Wis., assignor to The Rightway Corporation, a Corporation of Indiana Application September 26, 1930
Serial No. 484,579

10 Claims. (Cl. 37—181)

The present invention has for its object to utilize the thrust imposed on the grader or plow element of a motor grader or plow or the pull of a trailing load on a tractor or other motor-driven vehicle to give greater traction to driving or traction devices on the latter.

In carrying out my invention, the driven wheels or other traction element or elements are mounted so that they may swing bodily with respect to the vehicle about an axis transverse to the latter. The pushing or pulling force is imposed on the said traction means through a lever device in such a manner that there is a downward thrust on the traction means due to such pushing or pulling force; this thrust increasing and decreasing with the load that is being pushed or drawn. This I accomplish by mounting the traction means whose traction is to be increased at one end of a rigid member hinged at its other end to some part of the vehicle for up and down swinging movements, and which may be a bridge connecting the axle of a traction wheel or wheels with the axle of another pair of wheels that may or may not be traction wheels. The pull of a draft device or the thrust of a grading element or plow is delivered to swinging member or bridge in such a direction or at such a point on the latter, or both, that a pressure is exerted on the swinging member in a direction to force its free end down.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figures 1 and 2 are respectively a top plan view and a side elevation of so much of a motor driven road grader embodying my invention as is useful for an understanding of the invention; Fig. 3 is an elevation of the rear end of the grader, on an enlarged scale, with the near wheels left off, a drawbar being shown attached thereto; and Fig. 4 is a side view of a motor driven plow embodying my invention, only so much of the vehicle structure being shown as is needed to explain the invention.

My invention is adapted for use on any kind of a motor driven vehicle, whether it be a truck being used to pull or push a load, a tractor, a road grader, or a plow. For the sake of brevity I shall, however, describe the invention in detail only as applied to a grader and a plow, since the principles and mode of operation are the same regardless of the particular kind of vehicle.

Referring to Figs. 1 to 3 of the drawings, 1, 2 and 3 are the front and two rear axles of a motor driven road grader. On each axle are shown two wheels, as indicated at 4, 5 and 6, respectively. The rear wheels 6 are power driven and so, also, in the arrangement shown, are the wheels 5. The axle 3 is journalled in the rear end of a heavy frame 7 through the front end of which the axle 2 passes and forms a hinge pin supporting the frame or bridge for vertical swinging movements. The axle 2 may conveniently be any usual driving axle of a tractor or other motor vehicle and the axle 3 be driven therefrom by chains 8 passing over sprocket wheels 9 and 10 on these axles. The scraper element 11 is shown as lying below and supported by heavy arched beams 12, 12 as is common in machines of this kind. In accordance with my invention I connect the rear ends of these beams to the frame or bridge 7 in such a manner that the rearward thrust of the beams when the grader is in operation produces a downward pressure on the rear axle 3. Since the rear axle is free to swing down with the frame or bridge the downward pressure caused by the rearward thrust of the beams results in increasing the traction of the wheels on this axle, so that, the greater the load, the better will be the tractive effort of the rear wheels. In the arrangement shown, the rear ends of the beams 12 are connected to posts 13 rising from the frame or bridge somewhat to the rear of the axle 2; the connection being by means of pins 14 each passing through one of the beams and the corresponding post parallel with the axle 2.

The front end of the tractor frame 15 rests in a stirrup 16 pivotally connected at the upper ends of its arms to the beams 12, as indicated at 17. Consequently, the beams and the tractor frame can move relatively to each other sufficiently not only to permit the beams to deliver their thrust to the swinging traction device, but also to enable that traction device to move up and down relatively to the wheels 5 in traveling over rough ground.

At the longitudinal central axis of the frame or bridge, and somewhat in advance of the rearmost axle, is a pin 18 or other means to attach to the frame at a point above the plane of the axles 2 and 3 a drawbar 19 by means of which a load trailing behind the machine may be drawn ahead thereby. The pull on the drawbar tends to swing the rear end of the frame or bridge down. Consequently, there is exerted on the rearmost wheels a downward pressure which increases with the load, so that the greater the load, the greater will be the effective tractive effort of these wheels.

It will be seen that if the beams 12 are omitted from Fig. 3, the remaining structure may be regarded as the rear portion of a tractor having my improvements applied thereto, the drawbar serving to pull a gang plow, a trailer, or any other load.

In Fig. 4 I have shown my invention applied to a motor driven snow plow. The construction is the same as that just described except that it comprises a tractor having attached thereto a plow 20 instead of a grading element; the thrust of the plow being transmitted to the frame or bridge 7 through struts 21 that extend from points on the plow near the ground in an upward and rearward direction to the upper ends of the posts 13. When the plow meets resistance, the rearmost wheels are pressed down, the downward pressure increasing with the resistance. Consequently, when the plow is doing work, the machine has added traction, such added traction becoming greater with the load or, in other words, as the need for increased traction occurs.

It will thus be seen that I have produced a simple and novel means for increasing the tractive effort of a motor driven vehicle of any kind, as the work of the vehicle in pushing or drawing a load increases and greater traction is required; the downward pressure on the traction means, which may be the traction wheels of a two wheel drive, two of the wheels of a four wheel drive, an auxiliary traction wheel or wheels, or any suitable traction devices in these various situations, being produced through a lever action that may be proportional in each instance best to suit the particular service for which a given vehicle is intended.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. The combination with a vehicle, of a member hinged thereto at its front end for swinging movements about a transverse axis, a traction device connected to and supporting the rear end of said member at some distance from said axis, and means for transmitting a pushing force exerted by the vehicle to said member at such a point thereon that a downward thrust is imposed on said traction device.

2. The combination with a vehicle, of a member hinged at the front end to the vehicle for swinging movements about a transverse axis, a traction device connected to and supporting the rear end of said member, and means on said member at a higher level than the point of connection between the same and the traction device and toward the rear end of said member to anchor a draft connection to a load placed in rear of and being drawn ahead by the vehicle.

3. The combination with a vehicle and an element in the form of a material-moving tool associated therewith and adapted to be pushed ahead thereby, of a member hinged at one end to the vehicle for swinging movements about a transverse axis, a traction device supporting the other end of said member, and a connection between the aforesaid element and said member at such a point thereon that the resistance offered by said element to forward movement of the vehicle causes a substantial downward thrust on the said traction device.

4. A vehicle having three axles parallel to each other, a bridge connecting two of said axles and holding them in definite spaced relation while permitting either to swing about the axis of the other, a rigid frame connecting an intermediate point on said bridge to the third axle, traction devices on the axles connected by the bridge, and a material-moving tool carried by said frame.

5. A vehicle having three axles parallel to each other, a bridge connecting two of said axles and holding them in definite spaced relation while permitting either to swing about the axis of the other, a frame connecting an intermediate point on said bridge to the third axle, traction devices on the axles connected to said bridge, and means on said bridge for attaching thereto a load to be pushed.

6. A vehicle having supporting means including two parallel axles one behind the other, a bridge element connecting said axles and holding them in definite spaced relation to each other while permitting either to swing about the axis of the other, traction devices on said axles, and means on said bridge element above the plane of the axes of said axles between said axes and nearer one of said axes than the other to transmit to the bridge element a force tending to resist movement of the vehicle.

7. A vehicle having supporting means including two sets of traction wheels one behind the other, a bridge element connecting the two sets of wheels together and holding them in definite spaced relation to each other while permitting either set to swing about the axis of the other set, and separate means on said element above the plane of the axes of rotation of said wheels and near each of said axes to exert a push and a pull, respectively, on a load being pushed ahead and being drawn by the vehicle.

8. In combination, a tractor frame, traction wheels supporting the rear end of said frame, a second set of traction wheels in rear of the aforesaid wheels, a bridge connecting the two sets of traction wheels to hold them in definite spaced relation while permitting either set to swing about the axis of rotation of the other, a rigid frame connected at its rear end to the bridge above and between the axes of rotation of the two sets of traction wheels, a rolling support for the front end of said rigid frame, a stirrup carried by said rigid frame and supported at front end of the tractor frame so as to permit the latter to move up and down in the stirrup, and a material-moving tool underlying and supported by said rigid frame between said stirrup and the said rolling support.

9. In combination, two sets of traction wheels, a rigid bridge connecting said wheels to hold them in definite spaced relation to each other while permitting either set of wheels to swing bodily about the axes of rotation of the other set, a rigid frame supported at one end upon said bridge at a point between said axes, means for supporting the other end of said rigid frame, and a material-moving tool underlying and supported by said rigid frame.

10. In combination, a vehicle having a set of traction wheels, a rigid bridge hinged at one end to the vehicle for swinging movements about a transverse axis and supported at its other end by a second set of wheels, a material moving tool, and means to transmit the thrust of such tool to said bridge above the plane containing the axis of rotation of said second set of wheels and the hinge axis of said bridge and between the last two axes.

ARTHUR B. WEBB.